(12) United States Patent
Tsuchiya

(10) Patent No.: US 6,888,397 B2
(45) Date of Patent: May 3, 2005

(54) TEMPERATURE SENSOR CIRCUIT, SEMICONDUCTOR INTEGRATED CIRCUIT, AND METHOD OF ADJUSTING THE TEMPERATURE SENSOR CIRCUIT

(75) Inventor: Masahiko Tsuchiya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/636,310

(22) Filed: Aug. 6, 2003

(65) Prior Publication Data

US 2004/0095986 A1 May 20, 2004

(30) Foreign Application Priority Data

Aug. 27, 2002 (JP) ........................................ 2002-247300

(51) Int. Cl.[7] .............................................. H01L 35/00
(52) U.S. Cl. ...................... 327/512; 374/170; 374/181
(58) Field of Search ............................... 327/512, 513; 374/168–183

(56) References Cited

U.S. PATENT DOCUMENTS 6,140,860 A * 10/2000 Sandhu et al. .............. 327/513
6,674,185 B2 * 1/2004 Mizuta ...................... 307/651

* cited by examiner

Primary Examiner—Kenneth B. Wells
(74) Attorney, Agent, or Firm—Hogan & Hartson, LLP

(57) ABSTRACT

A temperature sensor circuit which includes: an adjustment circuit which generates a first divided voltage obtained by dividing a reference voltage; a current generation circuit which has a transistor element and generates a current corresponding to a gate voltage of the transistor element, the first divided voltage being supplied to a gate terminal of the transistor element; a voltage generation circuit which includes a diode element to which the current is supplied, an analog voltage being generated between both ends of the diode element; and an analog/digital (A/D) conversion circuit which compares a second divided voltage obtained by dividing the reference voltage with the analog voltage and converts the analog voltage into a digital value.

20 Claims, 16 Drawing Sheets

FIG. 12

| AMBIENT TEMPERATURE | ANALOG VOLTAGE |
|---|---|
| To | Vo |
| ⋮ | ⋮ |

FIG. 14

| AMBIENT TEMPERATURE | COUNTER VALUE |
|---|---|
| To | CNo |
| ┆ | ┆ | ns
TEMPERATURE SENSOR CIRCUIT, SEMICONDUCTOR INTEGRATED CIRCUIT, AND METHOD OF ADJUSTING THE TEMPERATURE SENSOR CIRCUIT

Japanese Patent Application No. 2002-247300 filed on Aug. 27, 2002, is hereby incorporated by reference in its entirety.

BACKGROUND OF THE INVENTION

The present invention relates to a temperature sensor circuit, a semiconductor integrated circuit including the temperature sensor circuit, and a method of adjusting the temperature sensor circuit.

A display control circuit for a display device using an electro-optical element must control the display taking temperature dependence of the electro-optical element into consideration. In the case where a liquid crystal is used as the electro-optical element, transmittance of the liquid crystal differs depending on the ambient temperature even at the same applied voltage. Therefore, the display control circuit must apply a voltage corresponding to the ambient temperature to the electro-optical element by performing temperature compensation.

BRIEF SUMMARY OF THE INVENTION

According to one aspect of the present invention there is provided a temperature sensor circuit including an adjustment circuit which generates a first divided voltage obtained by dividing a reference voltage, a current generation circuit which has a transistor element and generates a current corresponding to a gate voltage of the transistor element, the first divided voltage being supplied to a gate terminal of the transistor element, a voltage generation circuit which includes a diode element to which the current is supplied, an analog voltage being generated between both ends of the diode element and an analog/digital (A/D) conversion circuit which compares a second divided voltage obtained by dividing the reference voltage with the analog voltage and converts the analog voltage into a digital value.

According to another aspect of the present invention there is provided a semiconductor integrated circuit including a power supply circuit, a temperature sensor circuit, a terminal which outputs at least one of the analog voltage and the digital value, and an electronic volume which adjusts a voltage from the power supply circuit based on a given setting value. The given setting value is determined based on one of the analog voltage and the digital value. According to a further aspect of the present invention there is provided a method of adjusting a temperature sensor circuit which has an adjustment circuit which generates a first divided voltage obtained by dividing a reference voltage, a current generation circuit which has a transistor element and generates a current corresponding to a gate voltage of the transistor element, a voltage generation circuit which includes a diode element to which the current is supplied, an analog voltage being generated between both ends of the diode element, and an analog/digital (A/D) conversion circuit which compares a second divided voltage obtained by dividing the reference voltage with the analog voltage and converts the analog voltage into a digital value.

The method includes specifying a target value associated with an ambient temperature, and adjusting the first divided voltage so that the digital value becomes equal to the target value.

According to still another aspect of the present invention, there is provided a method of adjusting a temperature sensor circuit which has an adjustment circuit which generates a first divided voltage obtained by dividing a reference voltage, a current generation circuit which has a transistor element and generates a current corresponding to a gate voltage of the transistor element, the first divided voltage being supplied to a gate terminal of the transistor element; and a voltage generation circuit which includes a diode element to which the current is supplied, an analog voltage being generated between both ends of the diode element.

The method includes specifying a target value associated with an ambient temperature, and adjusting the first divided voltage so that the analog voltage becomes equal to the target value.

BRIEF DESCRIPTION OF THE SEVERAL VIEWS OF THE DRAWING

FIG. 12 is a table showing an analog voltage corresponding to an ambient temperature.

FIG. 14 is a table showing a counter value corresponding to an ambient temperature.

DETAILED DESCRIPTION OF THE EMBODIMENT

Embodiments of the present invention are described below. Note that the embodiments described below do not in any way limit the scope of the invention laid out in the claims herein. In addition, all elements of the embodiments described below should not be taken as essential requirements of the present invention.

There may be a case where a temperature sensor circuit is provided to a display control circuit in order to apply a voltage corresponding to the ambient temperature to an electro-optical element. In this case, the temperature sensor circuit provides sensor outputs obtained at a reference ambient temperature and an ambient temperature during use, and these sensor outputs are relatively evaluated to specify the ambient temperature during use. A voltage corresponding to the specified ambient temperature is then applied to an electronic element.

However, since the temperature sensor circuits have process margins and their outputs depend on chips even under the same ambient temperature, the temperature cannot be precisely compensated corresponding to the ambient temperature.

Embodiments of the present invention may provide a temperature sensor circuit which enables to reduce the influence of the process margin to implement more precise temperature compensation, a semiconductor integrated circuit having such a temperature sensor circuit, and a method of adjusting the temperature sensor circuit.

The embodiments of the present invention are described below in detail with reference to the drawings.

1. Semiconductor Integrated Circuit

Figure 1:
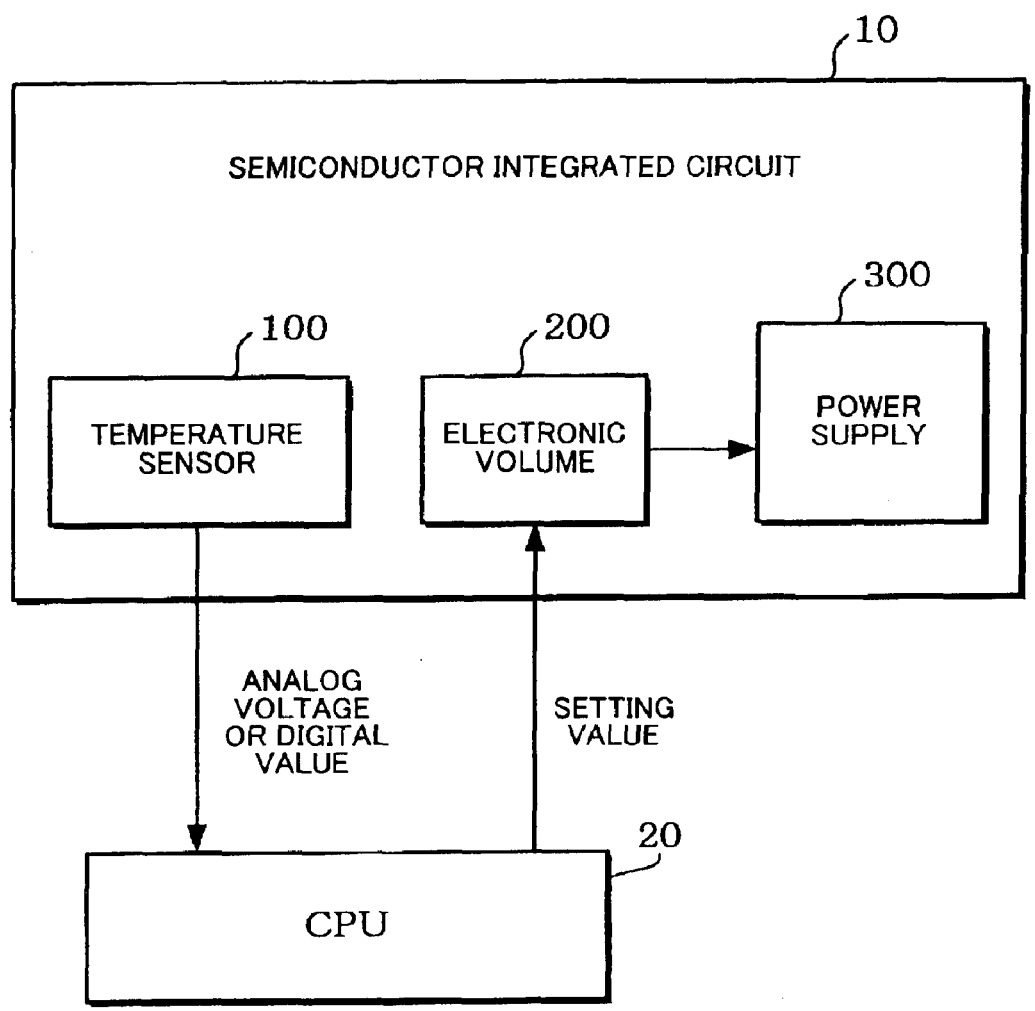
FIG. 1 is a schematic block diagram showing configuration of a semiconductor integrated circuit including a temperature sensor circuit according to one embodiment of the present invention.

FIG. 1 shows an outline of a configuration of a semiconductor integrated circuit including a temperature sensor circuit in the present embodiment.

A semiconductor integrated circuit 10 includes a temperature sensor circuit 100, an electronic volume 200, and a power supply circuit 300. The semiconductor integrated circuit 10 outputs an analog voltage or a digital value, which is the sensor output of the temperature sensor circuit 100, through an output terminal. A setting value is set to the electronic volume 200 of the semiconductor integrated circuit 10 through an input terminal.

The temperature sensor circuit 100 outputs an analog voltage corresponding to the ambient temperature or a digital value converted from the analog voltage.

The electronic volume 200 is capable of adjusting a voltage value generated by the power supply circuit 300 corresponding to the setting value set through the input terminal.

A central processing unit (hereinafter abbreviated as "CPU") 20 provided outside the semiconductor integrated circuit 10 is capable of controlling temperature compensation of the power supply circuit 300 by acquiring the output of the temperature sensor circuit 100 and setting the setting value to the electronic volume 200, for example.

It is possible to flexibly deal with temperature dependence of the object of control by outputting the sensor output of the temperature sensor circuit 100 to the outside and adjusting the electronic volume 200 based on the setting value calculated by the CPU 20 or the like, whereby temperature compensation can be controlled with high accuracy. For example, temperature dependence of a liquid crystal varies to a large extent depending on the manufacturer and the liquid crystal material. General-purpose temperature compensation can be controlled by externally calculating the setting value, whereby high-accuracy temperature compensation can be achieved independent of the liquid crystal.

In the present embodiment, the output of the temperature sensor circuit 100 is not dependent on the manufacturing process. Specifically, the output of the temperature sensor circuit 100 is an absolute value independent of the manufacturing process. Therefore, the temperature sensor circuit 100 outputs a value independent of the manufacturing process by performing adjustment as described below during sensing. Since the user can associate the output of the temperature sensor circuit 100 with the ambient temperature by using the output of the temperature sensor circuit 100, it suffices that the user merely specify the ambient temperature corresponding to the absolute value and calculate the setting value corresponding to the ambient temperature differing from the case of specifying the temperature dependence from a relative change, for example. Therefore, control can be simplified and temperature compensation can be performed with higher accuracy.

2. Temperature Sensor Circuit

Figure 2:
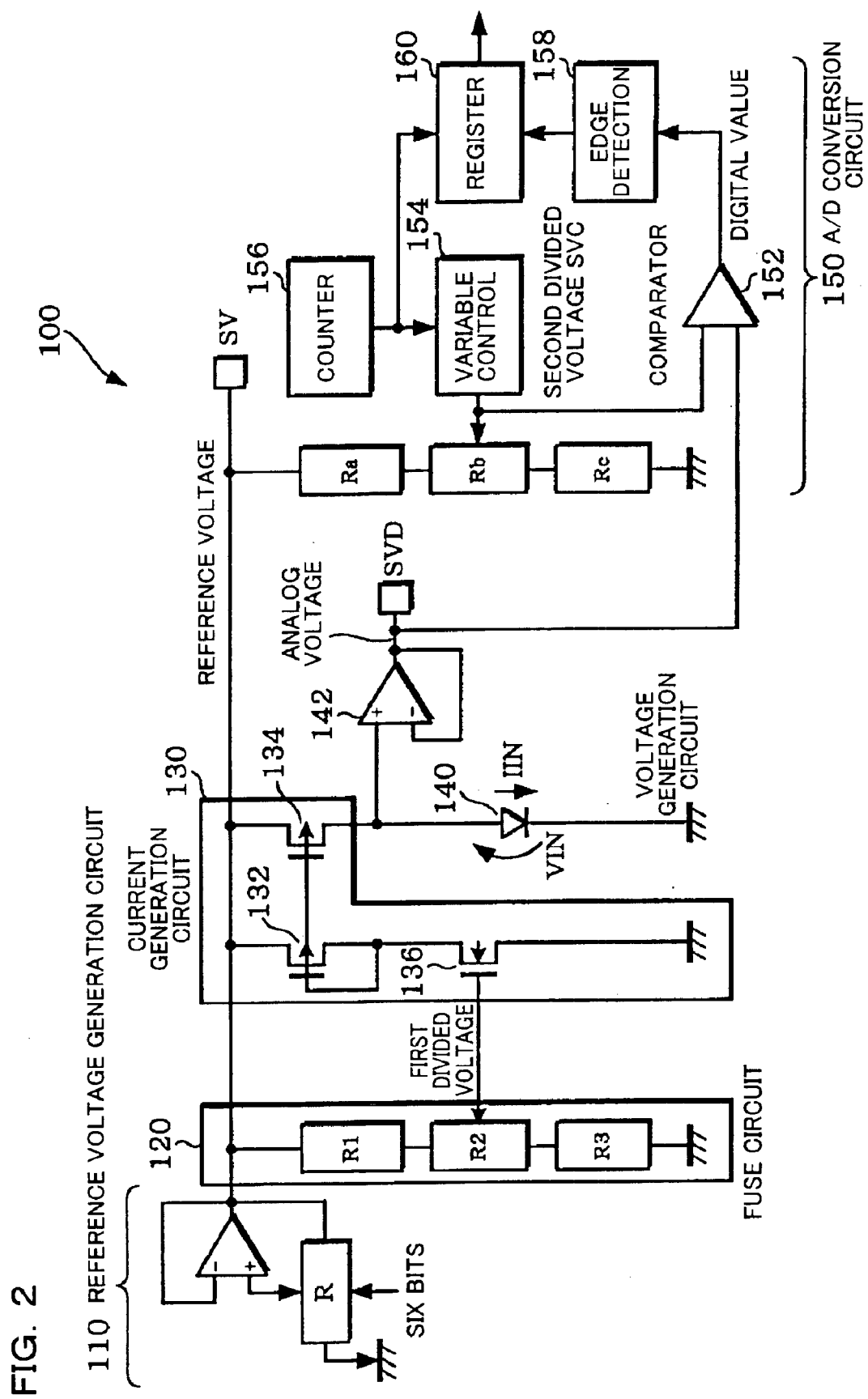
FIG. 2 is a schematic diagram of a temperature sensor circuit.

FIG. 2 shows a configuration example of the temperature sensor circuit.

The temperature sensor circuit 100 includes a fuse circuit (adjustment circuit in a broad sense) 120, a current generation circuit 130, a voltage generation circuit 140, and an analog/digital (A/D) conversion circuit 150. The temperature sensor circuit 100 may include a reference voltage generation circuit 110 which generates an adjustable reference voltage.

The fuse circuit 120 includes resistor groups R1, R2, and R3 connected in series between a reference voltage signal line to which the reference voltage is supplied and a grounding line. The dividing ratio of the resistor group R2 can be adjusted by selecting a fusible fuse element connected with the resistor group R2. A first divided voltage is removed from the dividing point of the resistor group R2.

Figure 3:
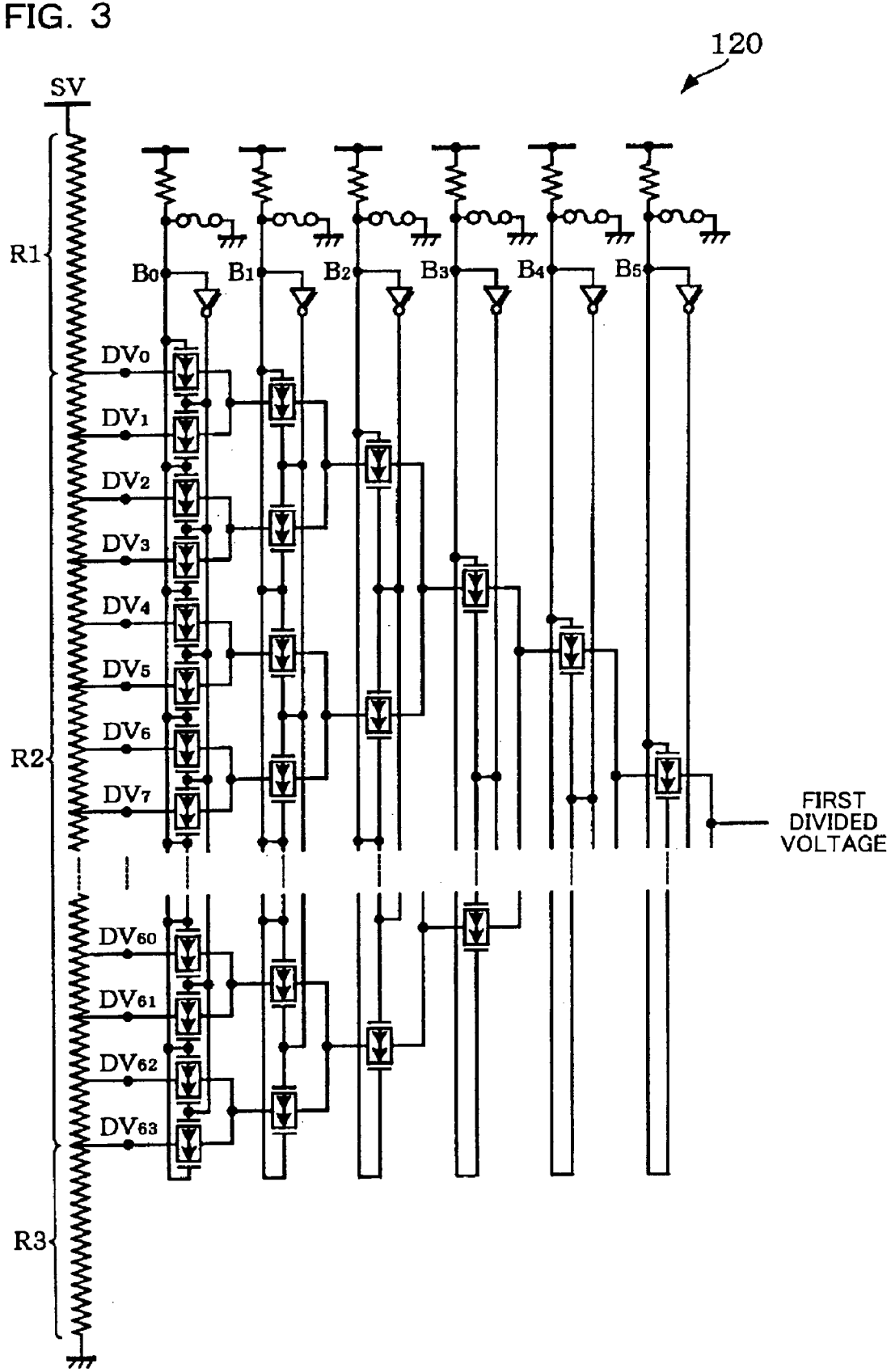
FIG. 3 is a schematic diagram of a fuse circuit.

FIG. 3 shows a detailed configuration example of the fuse circuit.

The fuse circuit 120 outputs the first divided voltage from one of 64 dividing points indicated by six bits $B_0$ to $B_5$. The fuse circuit 120 includes a selector group to which signal lines connected with the 64 dividing points $DV_0$ to $DV_{63}$ are connected. Each selector circuit which makes up the selector group is a two-input, one-output select circuit. The selector group selects 32 dividing points from the 64 dividing points in a first stage, selects 16 dividing points from the 32 dividing points in a second stage, and outputs voltage at one dividing point selected in a sixth stage as the first divided voltage. Each of the six bits is supplied as a select control signal in each stage.

A bit signal line which retains the state of each bit is pulled up through a high resistance circuit, and is grounded through a fuse element. Therefore, the state of the bit signal line of which the fuse element is not blown is "0", and the state of the bit signal line of which the fuse element is blown is "1". This enables an arbitrary dividing point of the resistor group R2 to be selected by selecting whether or not to blow the fuse element connected with each bit signal line.

If the resistance ratio of the resistor groups R1, R2, and R3 is "2:2:7", for example, the fuse circuit 120 is capable of outputting one of 64 voltages between a voltage obtained by dividing the reference voltage at a ratio of "4:7" and a voltage obtained by dividing the reference voltage at a ratio of "2:9" as the first divided voltage.

FIG. 3 illustrates the case where the fuse circuit 120 divides the reference voltage by using the resistor groups R1, R2, and R3. However, the present invention is not limited thereto. For example, the fuse circuit 120 may output the reference voltage as the first divided voltage.

As shown in FIG. 2, the first divided voltage output from the fuse circuit 120 is input to the current generation circuit 130.

The current generation circuit 130 includes p-type transistors 132 and 134 of which source terminals are connected with the reference voltage signal line, and an n-type transistor 136 of which a source terminal is grounded. A gate terminal and a drain terminal of the p-type transistor 132 are connected. The gate terminal of the p-type transistor 132 is connected with a gate terminal of the p-type transistor 134. A drain terminal of the p-type transistor 132 is connected with a drain terminal of the n-type transistor 136. A drain terminal of the p-type transistor 134 is connected with the voltage generation circuit 140.

In the current generation circuit 130 having such a configuration, a drain current of the n-type transistor 136 is controlled corresponding to a gate voltage of the n-type transistor 136 to which the first divided voltage adjusted by the fuse circuit 120 is supplied. Since the p-type transistors 132 and 134 have a current mirror structure, if the channel width/channel length (W/L) of the p-type transistors 132 and 134 is "1:2", a drain current IIN of the p-type transistor 134 is twice a drain current $I_D$ of the p-type transistor 132.

The drain current IIN of the p-type transistor 134 is input to the voltage generation circuit 140.

The voltage generation circuit 140 includes a diode element. The anode of the diode element is connected with the drain terminal of the p-type transistor 134. The cathode of the diode element is grounded. Therefore, in the voltage generation circuit 140, voltage is generated between both ends of the diode element corresponding to the drain current IIN flowing through the diode element and is output as an analog voltage. In FIG. 2, an analog voltage SVD is output from an analog voltage output terminal through a voltage-follower-connected operational amplifier circuit 142 in order to increase drive capability.

The A/D conversion circuit 150 converts the analog voltage SVD output from the analog voltage output terminal into a digital value. Therefore, the A/D conversion circuit 150 includes a comparator 152.

The comparator 152 compares the analog voltage SVD with a second divided voltage SVC, and outputs the comparison result. The comparator 152 outputs a comparison result "1" if the analog voltage SVD is higher than the second divided voltage SVC and outputs a comparison result "0" if the analog voltage SVD is lower than the second divided voltage SVC, or outputs a comparison result "0" if the analog voltage SVD is higher than the second divided voltage SVC and outputs a comparison result "1" if the analog voltage SVD is lower than the second divided voltage SVC.

The second divided voltage is removed from a dividing point of a resistor group Rb among resistor groups Ra, Rb, and Rc connected in series between the reference voltage signal line and a grounding line. A variable control circuit 154 selects the dividing point of the resistor group Rb. The variable control circuit 154 is controlled by using a counter value of a counter 156 which increments or decrements the counter value.

The resistance ratio of the resistor groups Ra, Rb, and Rc is preferably determined taking temperature dependence of the reference voltage and the analog voltage into consideration.

Figure 4:
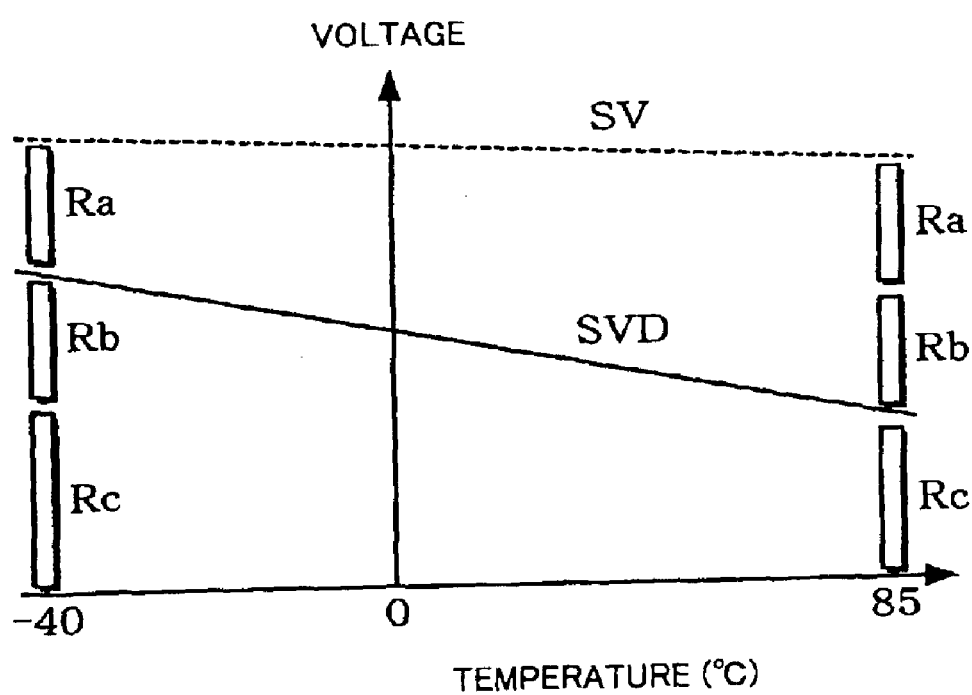
FIG. 4 is a schematic diagram illustrative of the temperature dependence of a reference voltage and an analog voltage.

FIG. 4 schematically shows temperature dependence of the reference voltage and the analog voltage.

The horizontal axis indicates an ambient temperature between −40° C. and 85° C., and the vertical axis indicates changes in the reference voltage SV and the analog voltage SVD. The reference voltage SV and the analog voltage SVD are decreased as the ambient temperature is increased, but the slope indicating the temperature dependence differs between the reference voltage SV and the analog voltage SVD. As shown in FIG. 4, the analog voltage SVD is sloped to a larger extent than the reference voltage SV and has a temperature dependence greater than that of the reference voltage SV.

Therefore, the resistance ratio of the resistor groups Ra, Rb, and Rc is preferably determined taking the temperature dependence of the reference voltage SV into consideration and so that the second divided voltage SVC obtained by dividing the reference voltage SV includes at least the range within which the analog voltage SVD is changed. This enables a digital value for obtaining the second divided voltage to be obtained if the second divided voltage is equal to the analog voltage SVD.

The variable control circuit 154 which extracts the second divided voltage from the dividing point of the resistor group Rb is described below in more detail.

Figure 5:
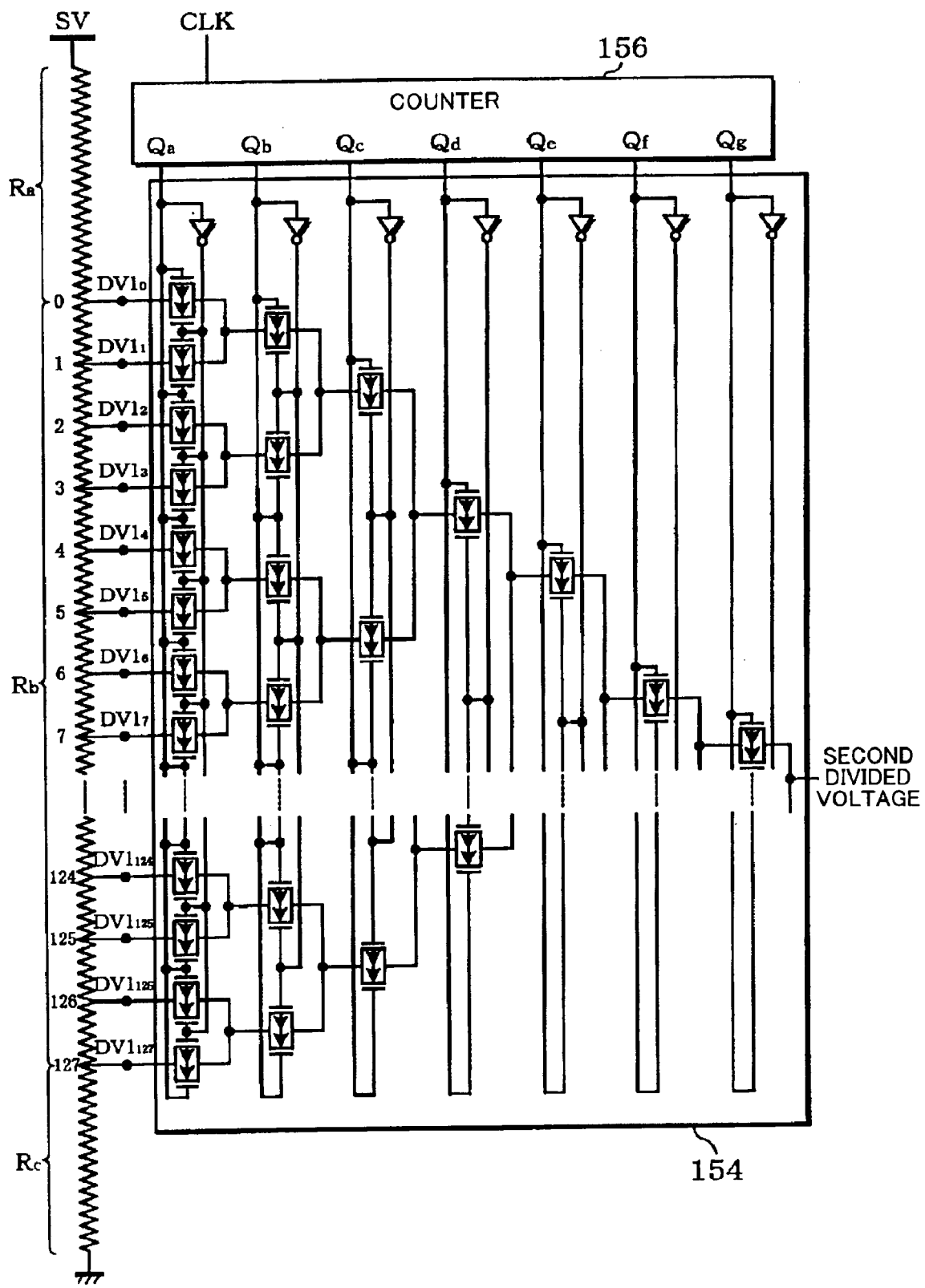
FIG. 5 is a schematic diagram showing a configurational example of a variable control circuit.

FIG. 5 shows a configuration example of the variable control circuit which extracts the second divided voltage from the dividing point of the resistor group Rb by using the counter value of the counter.

The variable control circuit 154 is capable of outputting one of voltages at 128 dividing points indicated by seven bits as the second divided voltage based on the counter value of the 7-bit counter 156 which increments or decrements the counter value in synchronization with a clock signal CLK. The variable control circuit 154 has the same configuration as the selector group of the fuse circuit 120 shown in FIG. 3. Therefore, output values Qa to Qg of the counter 156 are changed each time the counter value is incremented or decremented, and the dividing point to be selected is changed corresponding to the output values Qa to Qg.

Figure 6:
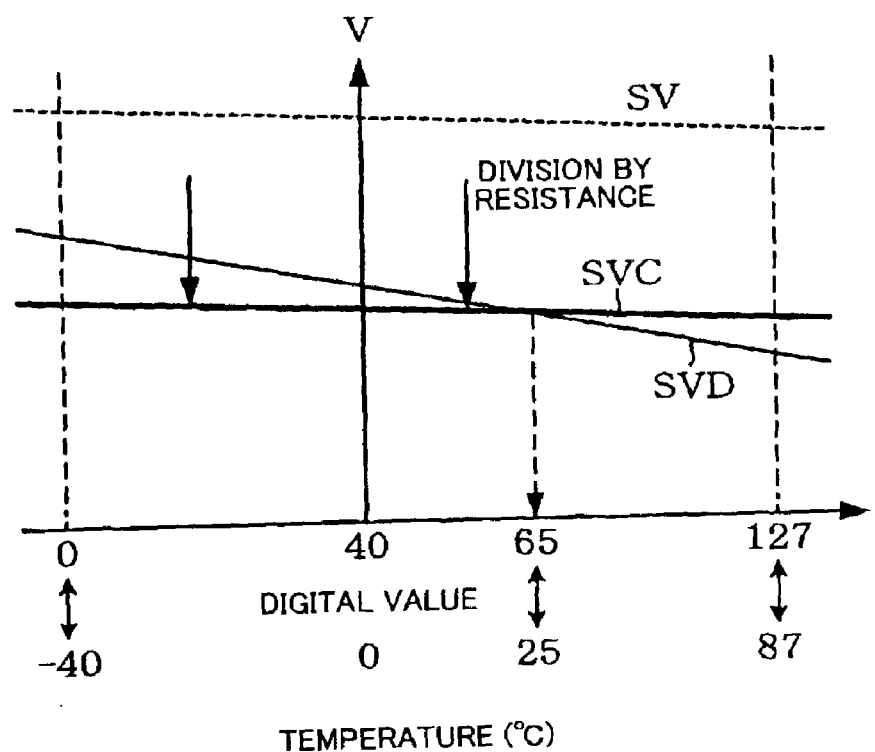
FIG. 6 is a graph schematically showing temperature gradient of a second divided voltage.

For example, if the voltage at a dividing point $DV1_0$ is output as the second divided voltage when the counter value is "0", the voltages at dividing points $DV1_1$, $DV1_2$, . . . and $DV1_{127}$ are sequentially output as the second divided voltage each time the counter value is incremented. The second divided voltage is a voltage obtained by dividing the reference voltage SV, and has a temperature gradient equal to the temperature gradient of the reference voltage SV, as shown in FIG. 6.

In this case, since the second divided voltage is decreased as the counter value is increased, there is a point at which the temperature characteristics of the analog voltage SVD intersect the temperature characteristics of the second divided voltage SVC. The comparator 152 shown in FIG. 2 detects the intersection point at the ambient temperature.

Figure 7:
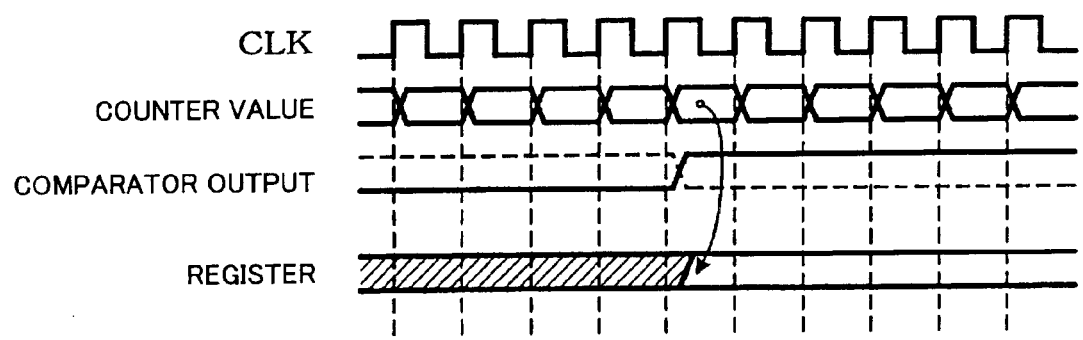
FIG. 7 is a timing chart showing an example of operation timing of an analog/digital (A/D) conversion circuit.

In FIG. 2, output of the comparator 152 is input to an edge detection circuit 158. The edge detection circuit 158 detects that the comparison result of the comparator 152 is changed from "0" to "1" or from "1" to "0", and outputs the detection result to a register 160 as a pulse, for example. The counter value output from the counter 156 is supplied to the register 160. The register 160 retains the counter value based on the detection result of the edge detection circuit 158. As shown in FIG. 7, the counter value is incremented in synchronization with the clock signal CLK. The output of the comparator 152 is changed when the analog voltage SVD becomes equal to the second divided voltage SVC, and the register 160 latches the counter value of the counter 156 in synchronization with the pulse output from the edge detection circuit 158. The counter value retained in the register 160 is read by the external CPU or the like through a read line (not shown).

128 states can be indicated by using seven bits. Therefore, each state at an ambient temperature from −40° C. to 87° C. can be specified by using the counter value by assigning each of the 128 states to the ambient temperature. Therefore, the ambient temperature can be associated with the counter value (digital value) by the A/D conversion circuit 150 having the above-described configuration.

In FIG. 2, the reference voltage is generated by the reference voltage generation circuit 110. However, the present invention is not limited thereto. The reference voltage generation circuit 110 is capable of generating a desired reference voltage by arbitrarily changing the dividing ratio of a resistor R having 64 states indicated by six bits, for example. The reference voltage generation circuit 110 may be formed so that an arbitrary resistance ratio can be set based on 6-bit data set in a given setting register by using the selector group of the fuse circuit 120 shown in FIG. 3. The reference voltage is preferably lower than a system power supply voltage supplied from the outside in order to adjust the voltage by using a regulator or the like without using a charge-pump circuit. The reference voltage is preferably lower than the system power supply voltage in an amount corresponding to the voltage adjustment error range of the regulator or the like. In the case where the system power supply is 3 V, the reference voltage is preferably lower than 2.7 V (allowable error: −10%), for example. In the case where the adjustment error range is 0.2 V, the reference voltage is preferably 2.5 V or less such as about 2.2 V, for example.

3. Method of Adjusting Temperature Sensor Circuit

A method of adjusting the temperature sensor circuit having the above configuration is described below.

Figure 8:
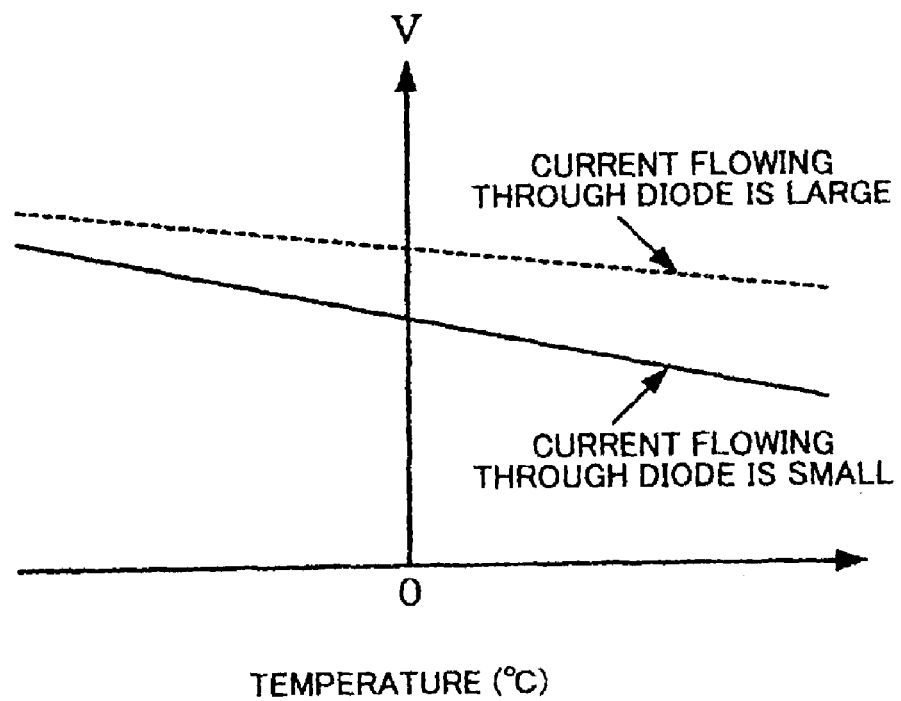
FIG. 8 is a graph showing temperature characteristics of a voltage generated between both ends of a diode element corresponding to a current flowing through the diode element.

As shown in FIG. 8, temperature characteristics of the voltage generated between both ends of the diode element included in the voltage generation circuit 140 differ depending on the amount of current flowing through the diode element. Therefore, it is preferable to make current flowing through the diode element constant.

Figure 9:
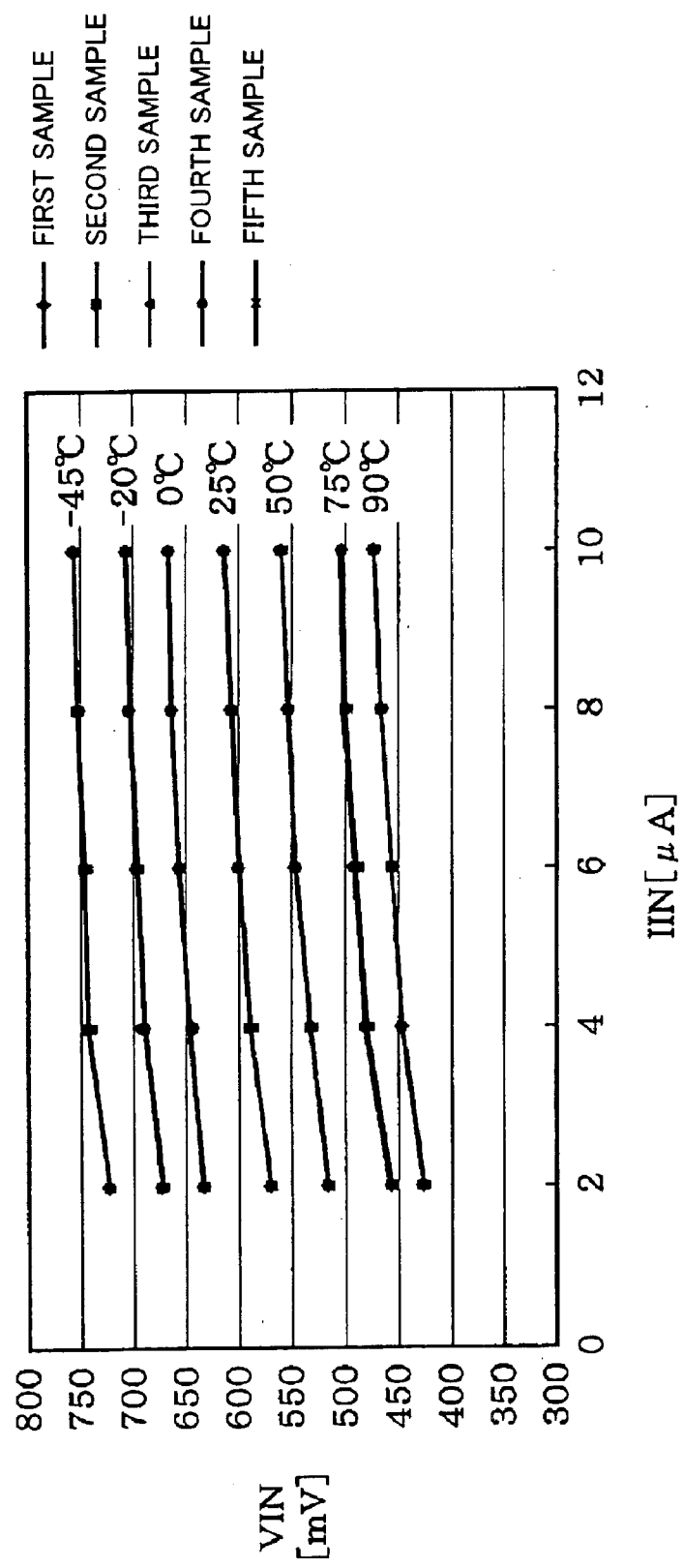
FIG. 9 is a graph showing current-voltage conversion characteristics of diode elements under different manufacturing conditions at different ambient temperatures.
Figure 10:
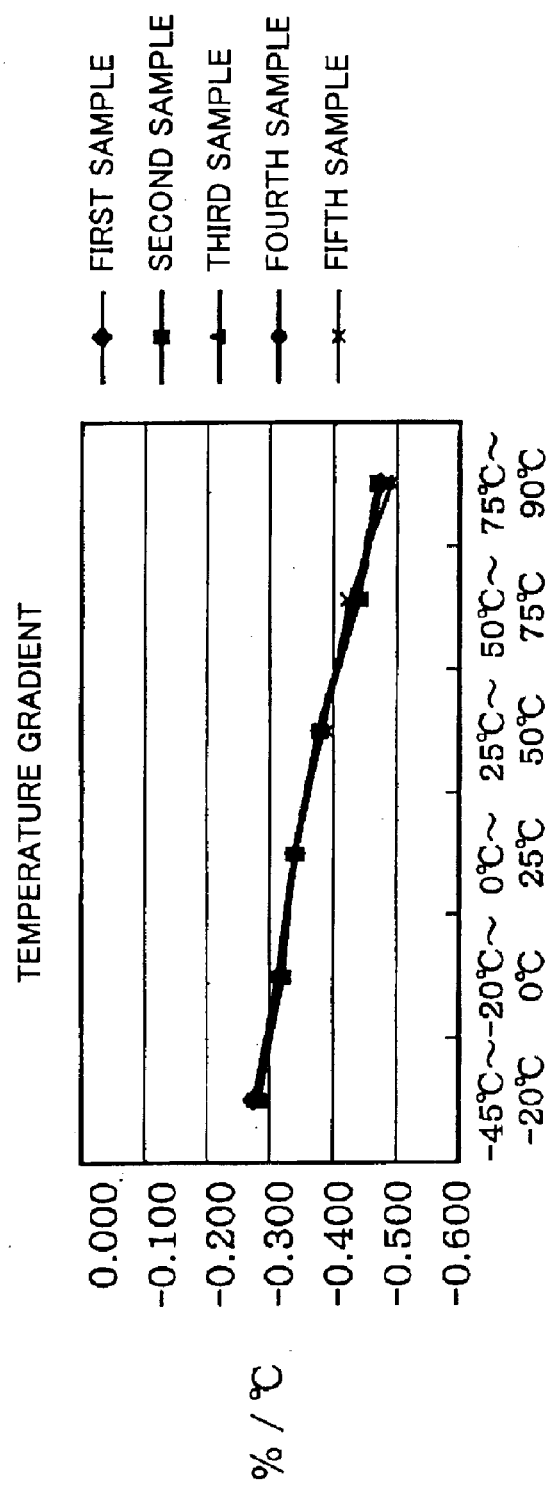
FIG. 10 is a graph showing temperature gradient of diode elements under different manufacturing conditions.

FIG. 9 shows current-voltage conversion characteristics of five types of diode elements under different manufacturing conditions at each ambient temperature. FIG. 10 shows a temperature gradient in the case where the current IIN flowing through the diode element is 6 µA. As shown in FIGS. 9 and 10, the voltage generated between both ends of the diode element has no manufacturing process dependence when the current IIN and the temperature are constant. The temperature gradient which indicates the temperature dependence has no manufacturing process dependence when the current IIN is constant.

Therefore, if the current flowing through the diode element is constant, the voltage generated between both ends of the diode element has no manufacturing process dependence and is constant. Therefore, the amount of current flowing through the diode element may be adjusted corresponding to the manufacturing process so that an analog voltage corresponding to the ambient temperature is output. In more detail, the first divided voltage which is output by selecting the dividing point of the fuse circuit 120 is adjusted so that the analog voltage SVD becomes equal to a target voltage, whereby current flowing through the diode element for obtaining an analog voltage corresponding to the ambient temperature during adjustment can be trimmed. This enables the user to specify the ambient temperature by using the analog voltage SVD obtained through an analog voltage output terminal.

3.1 Adjustment Using Analog Voltage

Figure 11:
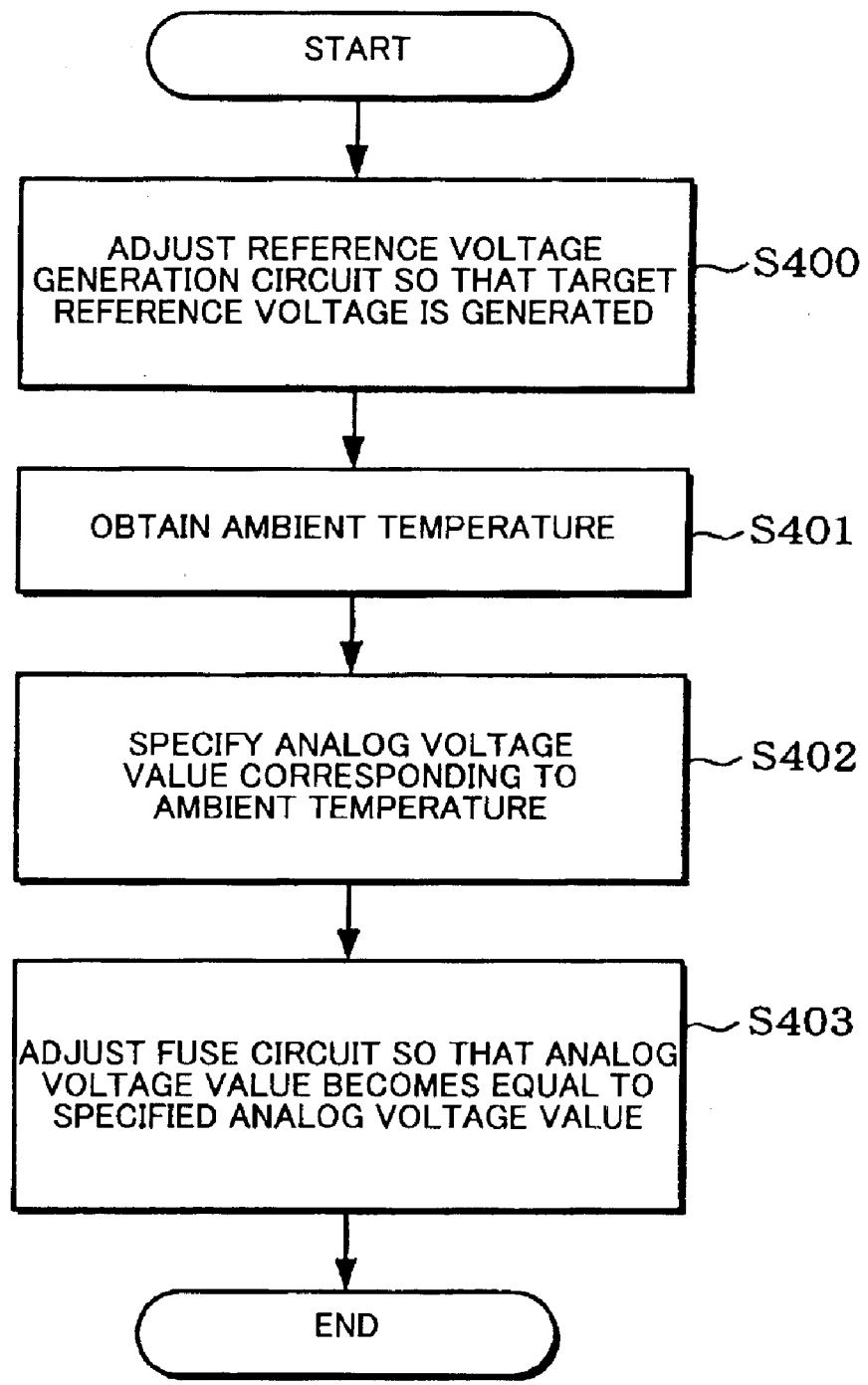
FIG. 11 is a flowchart showing an example of temperature adjustment by the temperature sensor circuit using an analog voltage.

FIG. 11 shows an example of adjustment of the temperature sensor circuit using an analog voltage.

The reference voltage generation circuit 110 is adjusted so that a target reference voltage is generated (step S400).

An ambient temperature is obtained (step S401), and an analog voltage value (target value in a broad sense) registered in advance corresponding to the ambient temperature is specified (step S402). This may be achieved by allowing the CPU or the like to calculate an analog voltage $V_0$ corresponding to the ambient temperature $T_0$ by referring to a correspondence table shown in FIG. 12.

The first divided voltage is adjusted by selecting the dividing point of the fuse circuit 120 so that the analog voltage value becomes equal to the analog voltage $V_0$ specified in the step S402 (step S403). An optimum dividing point can be selected by allowing the CPU or the like to monitor the analog voltage output from the output terminal SVD while rewriting the contents of the register in which the values for each bit signal line shown in FIG. 3 are temporarily set.

3.2 Adjustment Using Digital Value

The temperature sensor circuit 100 may be adjusted by using a digital value converted from the analog voltage. In this case, since it is unnecessary to externally convert the analog value, the temperature sensor circuit can be adjusted with high accuracy without depending on A/D conversion accuracy.

Figure 13:
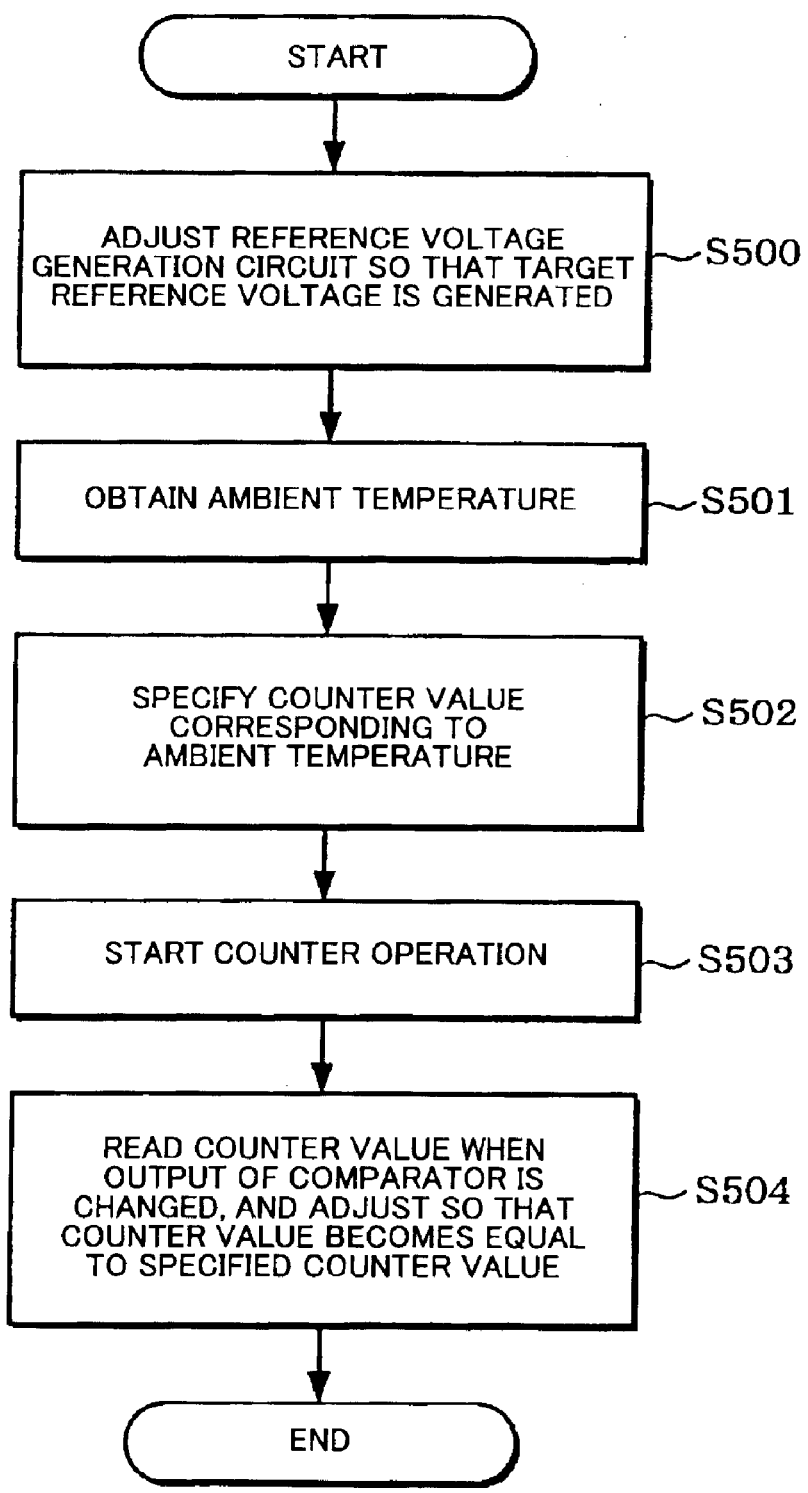
FIG. 13 is a flowchart showing an example of temperature adjustment by the temperature sensor circuit using a digital value.

FIG. 13 shows an example of an adjustment flow of the temperature sensor circuit by using a digital value.

The reference voltage generation circuit 110 is adjusted so that a target reference voltage is generated (step S500).

An ambient temperature is obtained (step S501), and a counter value (digital value) (target value in a broad sense) registered in advance corresponding to the ambient temperature is specified (step S502). This may be achieved by allowing the CPU or the like to calculate a counter value $CN_0$ corresponding to the ambient temperature $T_0$ by referring to a correspondence table shown in FIG. 14.

The operation of the counter 156 is started (step S503). The counter value retained in the register 160 is read when the output of the comparator 152 is changed, and the first divided voltage output from the fuse circuit 120 is adjusted so that the counter value becomes equal to the counter value specified in the step S502 (step S504).

3.3 Adjustment of Electronic Volume

Figure 15:
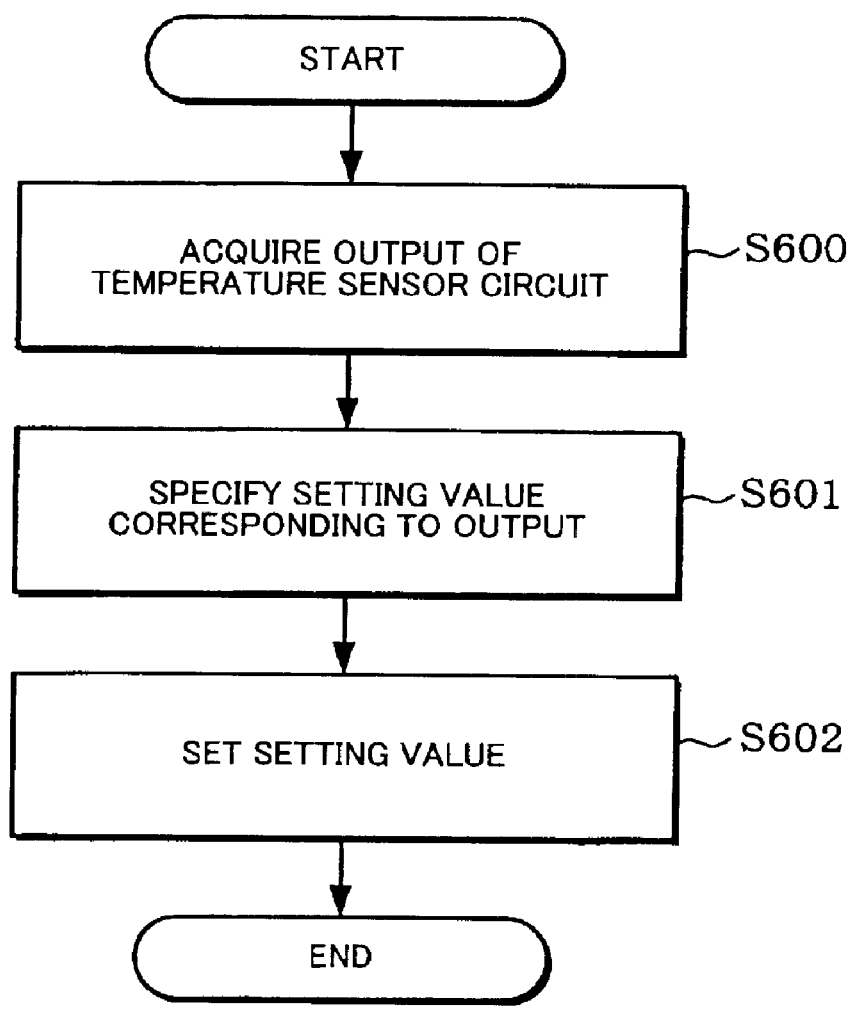
FIG. 15 is a flowchart showing an example of electronic volume adjustment according to one embodiment of the present invention.

FIG. 15 shows an example of adjustment of the electronic volume of the semiconductor integrated circuit shown in FIG. 1.

As shown in FIG. 11 or 13, an analog voltage or a digital value independent of the manufacturing process of the semiconductor integrated circuit including the temperature sensor circuit 100 can be obtained by adjusting the temperature sensor circuit 100 by using an analog voltage or a digital value converted from the analog voltage. The CPU 20 acquires an analog voltage or a digital value output from the temperature sensor circuit 100 (step S600).

The CPU 20 specifies a setting value corresponding to the analog voltage or the digital value (step S601). The CPU 20 can specify an ambient temperature $T_1$ sensed in the step S600 from the analog voltage or digital value acquired in the step S600. Therefore, the CPU 20 calculates a setting value registered in advance corresponding to the ambient temperature $T_1$ by referring to a setting table.

The CPU 20 sets the electronic volume 200 of the semiconductor integrated circuit 10 by using the setting value specified in the step S601 (step S602).

An adjustment flow of the electronic volume in a comparative example is described below in order to describe the effects of the present embodiment. In the comparative example, since a temperature sensor circuit cannot output a value independent of the manufacturing process, temperature compensation is carried out according to a flow as described below.

Figure 16:
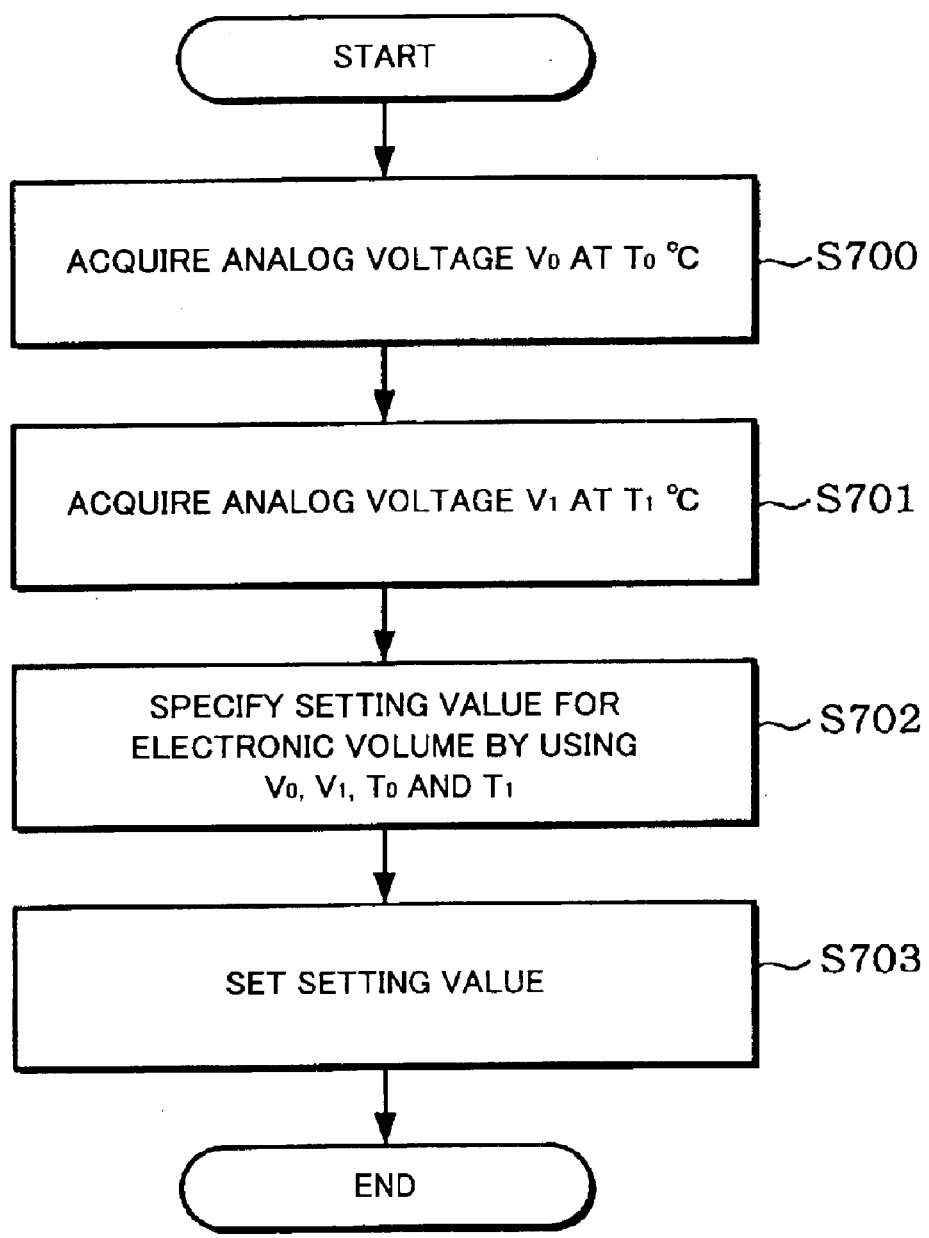
FIG. 16 is a flowchart showing a comparative example of electronic volume adjustment.

FIG. 16 shows an example of an adjustment flow of the electronic volume of the semiconductor integrated circuit in the comparative example.

In the comparative example, the CPU acquires an analog voltage $V_0$ at an ambient temperature of $T_0°$ C. (step S700).

The CPU acquires an analog voltage $V_1$ at an ambient temperature of $T_1°$ C. (step S701).

The CPU presumes an ambient temperature at which the analog voltage $V_0$ at the ambient temperature $T_0$ is changed to the analog voltage $V_1$ as an ambient temperature $T_1$, and specifies a setting value for the electronic volume corresponding to the ambient temperature $T_1$ (step S702).

The CPU sets the electronic volume of the semiconductor integrated circuit by using the setting value specified in the step S702 (step S703).

In the comparative example, since the temperature dependence is specified by using the relative change, the value set to the electronic volume differs depending on manufacturing process variation, accuracy of the analog voltage acquired, evaluation algorithm errors during relative evaluation, and the like, it is difficult to perform high accuracy temperature compensation.

In the present embodiment, since the output of the temperature sensor circuit 100 is an absolute value independent of the manufacturing process, the ambient temperature can be specified by using the absolute value. Therefore, it suffices that the CPU 20 merely calculate the setting value corresponding to the ambient temperature. Therefore, control can be simplified and temperature compensation can be performed with higher accuracy.

The present invention is not limited to the above-described embodiments, and various modifications can be made within the scope of the present invention.

The above-described embodiments illustrate the case of using the fuse circuit as the adjustment circuit. However, the present invention is not limited thereto. It suffices that the adjustment circuit be a circuit which generates an adjustable voltage.

The reference voltage generation circuit 110 is used to supply the reference voltage to the reference voltage signal line in FIG. 2, but the present invention is not limited thereto.

The specification discloses the following matters about the configuration of the embodiments described above.

According to one embodiment of the present invention, there is provided a temperature sensor circuit including an adjustment circuit which generates a first divided voltage obtained by dividing a reference voltage, a current generation circuit which has a transistor element and generates a current corresponding to a gate voltage of the transistor element, the first divided voltage being supplied to a gate terminal of the transistor element, a voltage generation circuit which includes a diode element to which the current is supplied, an analog voltage being generated between both ends of the diode element, and an analog/digital (A/D) conversion circuit which compares a second divided voltage obtained by dividing the reference voltage with the analog voltage and converts the analog voltage into a digital value.

The analog voltages generated between both ends of the diode element have the same value independent of the manufacturing process if a current flowing through the diode element and the ambient temperature are constant.

This temperature sensor circuit can control a current flowing through the diode element by adjusting the first divided voltage using a circuit for adjustment (such as a fuse circuit) so that an analog voltage corresponding to the ambient temperature during adjustment is generated. After that, the analog voltage can be associated with the ambient temperature, so the ambient temperature can be precisely specified by extremely simple control. In particular, temperature compensation can be controlled independent of the accuracy of an external A/D conversion circuit by obtaining a digital value by using the A/D conversion circuit.

According to another embodiment of the present invention, there is provided a semiconductor integrated circuit including a power supply circuit, a temperature sensor circuit, a terminal which outputs at least one of the analog voltage and the digital value, and an electronic volume which adjusts a voltage from the power supply circuit based on a given setting value. The given setting value is determined based on one of the analog voltage and the digital value.

In comparison with the case in which the electronic volume is directly adjusted by using outputs of the temperature sensor circuit in a semiconductor integrated circuit, the temperature sensor circuit enables more flexible and more precise temperature compensation, even if load characteristics of power supply circuits to be adjusted are largely different depending on the manufacturer or material, since the temperature compensation can be externally performed.

According to a further embodiment of the present invention, there is provided a method of adjusting a temperature sensor circuit which has an adjustment circuit which generates a first divided voltage obtained by dividing a reference voltage, a current generation circuit which has a transistor element and generates a current corresponding to a gate voltage of the transistor element, the first divided voltage being supplied to a gate terminal of the transistor element, a voltage generation circuit which includes a diode element to which the current is supplied, an analog voltage being generated between both ends of the diode element, and an analog/digital (A/D) conversion circuit which compares a second divided voltage obtained by dividing the reference voltage with the analog voltage and converts the analog voltage into a digital value.

The method includes specifying a target value associated with an ambient temperature, and adjusting the first divided voltage so that the digital value becomes equal to the target value.

The ambient temperature means an input measurement result of the ambient temperature during adjustment by the temperature sensor circuit.

The target value may be obtained by searching a table showing the target values associated with the ambient temperatures, for example.

The analog voltages obtained by adjusting the first divided voltages can be converted into digital values, so the digital values can be associated with the ambient temperatures. Therefore, the ambient temperatures can be precisely specified by very simple control. Since the A/D conversion circuit is used to obtain the digital values, the temperature compensation can be controlled without depending on the accuracy of an external A/D conversion circuit.

According to still another embodiment of the present invention, there is provided a method of adjusting a temperature sensor circuit which has an adjustment circuit which generates a first divided voltage obtained by dividing a reference voltage, a current generation circuit which has a transistor element and generates a current corresponding to a gate voltage of the transistor element, the first divided voltage being supplied to a gate terminal of the transistor element, and a voltage generation circuit which includes a diode element to which the current is supplied, an analog voltage being generated between both ends of the diode element.

The method includes specifying a target value associated with an ambient temperature, and adjusting the first divided voltage so that the analog voltage becomes equal to the target value.

Since the analog voltages can be obtained by adjusting the first divided voltages, the analog voltages can be associated with the ambient temperatures. Therefore, the ambient temperatures can be precisely specified by very simple control.

In the method of adjusting the temperature sensor circuit according to the embodiments of the present invention, a reference voltage corresponding to the ambient temperature may be generated prior to the specification of the target value.

According to the embodiments of the present invention, the temperature compensation is performed by using the analog voltages or the digital values after adjustment of the reference voltage corresponding to the ambient temperature, more precise temperature compensation is enabled.

What is claimed is:

1. A temperature sensor circuit comprising:
    an adjustment circuit which generates a first divided voltage obtained by dividing a reference voltage, the adjustment circuit having a plurality of resistor groups, wherein at least one of the resistor groups is configured to provide a dividing ratio that is adjustable by selecting a fusible fuse element connected to the at least one resistor group;
    a current generation circuit having a transistor element and generates a current corresponding to a gate voltage of the transistor element, the first divided voltage being supplied to a gate terminal of the transistor element;
    a voltage generation circuit which includes a diode element to which the current is supplied, an analog voltage being generated between each end of the diode element; and
    an analog/digital (A/D) conversion circuit which compares a second divided voltage obtained by dividing the reference voltage with the analog voltage and converts the analog voltage into a digital value.

2. The temperature sensor circuit as defined in claim 1, wherein the adjustment circuit includes a plurality of resistor groups connected in series between a reference voltage signal line to which the reference voltage is supplied and a rounding line.

3. The temperature sensor circuit as defined in claim 2, wherein the adjustment circuit includes a selector group to which signal lines are connected.

4. The temperature sensor circuit as defined in claim 1, wherein the transistor element is a p-type transistor.

5. The temperature sensor circuit as defined in claim 1, wherein the diode element of the voltage generation circuit and transistor element of the current generation circuit are connected by an anode and a drain terminal.

6. The temperature sensor circuit as defined in claim 1, wherein a cathode of the diode element is grounded.

7. The temperature sensor circuit as defined in claim 1, wherein the A/D converter includes a comparator.

8. The temperature sensor circuit as defined in claim 7, wherein the comparator outputs a high value if the analog voltage is higher than the second divided voltage and output a low value if the analog voltage is lower than the second divided voltage.

9. The temperature sensor circuit as defined in claim 2, wherein the A/D converter includes a counter, a variable control circuit and an edge detection circuit.

10. The temperature sensor circuit as defined in claim 9, wherein the variable control circuit extracts the second divided voltage from a dividing point of one of the resistor groups.

11. A semiconductor integrated circuit comprising:
    a power supply circuit;
    a temperature sensor circuit having:
        an adjustment circuit which generates a first divided voltage obtained by dividing a reference voltage;
        a current generation circuit having a transistor element and generates a current corresponding to a gate voltage of the transistor element, the first divided voltage being supplied to a gate terminal of the transistor element;
        a voltage generation circuit which includes a diode element to which the current is supplied, an analog voltage being generated between each end of the diode element; and
        an analog/digital (A/D) conversion circuit which compares a second divided voltage obtained by dividing the reference voltage with the analog voltage and converts the analog voltage into a digital value;
    a terminal which outputs at least one of the analog voltage and the digital value; and
    an electronic volume which adjust a voltage from the power supply circuit based on a given setting value,
    wherein the given setting value is determined based on one of the analog voltage and the digital value.

12. A method of adjusting a temperature sensor circuit, comprising:
    generating a first divided voltage obtained by dividing a reference voltage, a dividing ratio of the reference voltage being adjustable by selecting a fusible fuse element connected to at least one resistor group of a plurality of resistor groups;
    generating a current corresponding to a gate voltage of a transistor element, the first divided voltage being supplied to a gate terminal of the transistor element;
    supplying the current to a diode element with an analog voltage being generated between each end of the diode element;
    comparing a second divided voltage obtained by dividing the reference voltage with the analog voltage and converting the analog voltage into a digital value;
    specifying a target value associated with an ambient temperature; and
    adjusting the first divided voltage so that the digital value becomes equal to the target value.

13. The method of adjusting a temperature sensor circuit as defined in claim 12, further comprising generating the reference voltage corresponding to the ambient temperature before specifying the target value.

14. The method of adjusting the temperature sensor circuit as defined in claim 12, further comprising connecting the diode element and the transistor element by an anode and a drain terminal.

15. The method of adjusting the temperature sensor circuit as defined in claim 12, further comprising connecting a cathode of the diode element to ground.

16. A method of adjusting a temperature sensor circuit, comprising:
    generating a first divided voltage obtained by dividing a reference voltage, a dividing ratio of the reference voltage being adjustable by selecting a fusible fuse element connected to at least one resistor group of a plurality of resistor groups;
    generating a current corresponding to a gate voltage of a transistor element, the first divided voltage being supplied to a gate terminal of the transistor element;

supplying the current to a diode element with an analog voltage being generated between each end of the diode element;

specifying a target value associated with an ambient temperature; and adjusting the first divided voltage so that the analog voltage becomes equal to the target value.

17. The method of adjusting a temperature sensor circuit as defined in claim 16, further comprising generating the reference voltage corresponding to the ambient temperature before specifying the target value.

18. The method of adjusting the temperature sensor circuit as defined in claim 16, further comprising connecting the diode element and the transistor element by an anode and a drain terminal.

19. The method of adjusting the temperature sensor circuit as defined in claim 16, further comprising connecting a cathode of the diode element to ground.

20. A temperature sensor circuit comprising:

means for generating a first divided voltage obtained by dividing a reference voltage, a dividing ratio of the reference voltage being adjustable by selecting a fusible fuse element connected to at least one resistor group of a plurality of resistor groups;

a current generation circuit having a transistor element and generates a current corresponding to a gate voltage of the transistor element, the first divided voltage being supplied to a gate terminal of the transistor element;

a voltage generation circuit which includes a diode element to which the current is supplied, an analog voltage being generated between each end of the diode element; and an analog/digital (A/D) conversion circuit which compares a second divided voltage obtained by dividing the reference voltage with the analog voltage and converts the analog voltage into a digital value.

* * * * *